Feb. 26, 1963    F. HARTWIG    3,079,510
DRY SHAVING APPARATUS COMBINING VARYING SOURCES OF POWER
Filed Oct. 31, 1958    3 Sheets-Sheet 1

Inventor:
FRITZ HARTWIG
BY Toulmin & Toulmin
ATTORNEYS

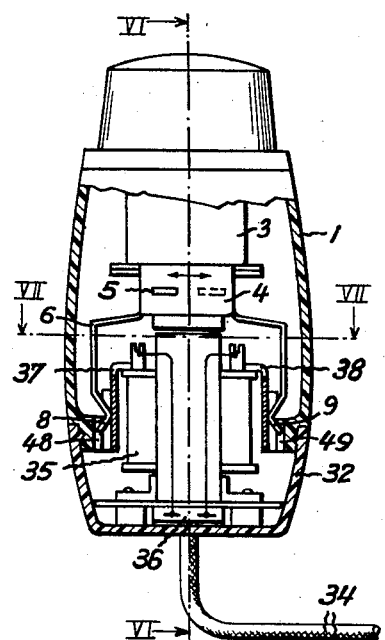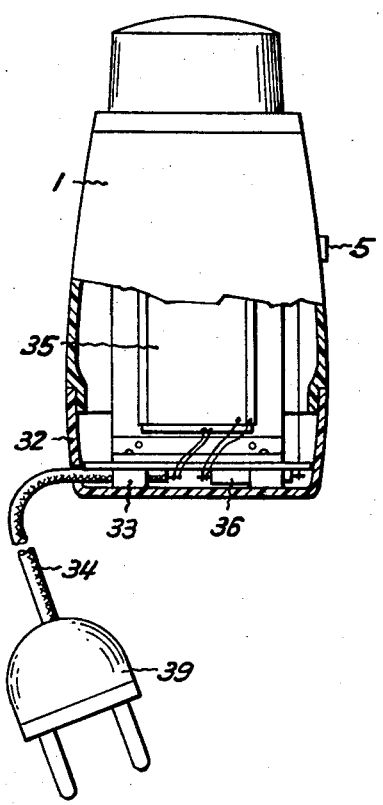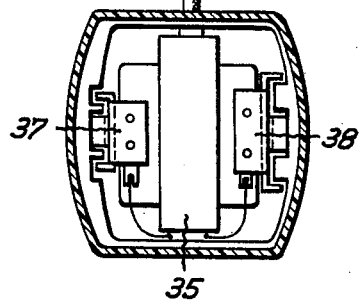

Feb. 26, 1963 F. HARTWIG 3,079,510
DRY SHAVING APPARATUS COMBINING VARYING SOURCES OF POWER
Filed Oct. 31, 1958 3 Sheets-Sheet 3
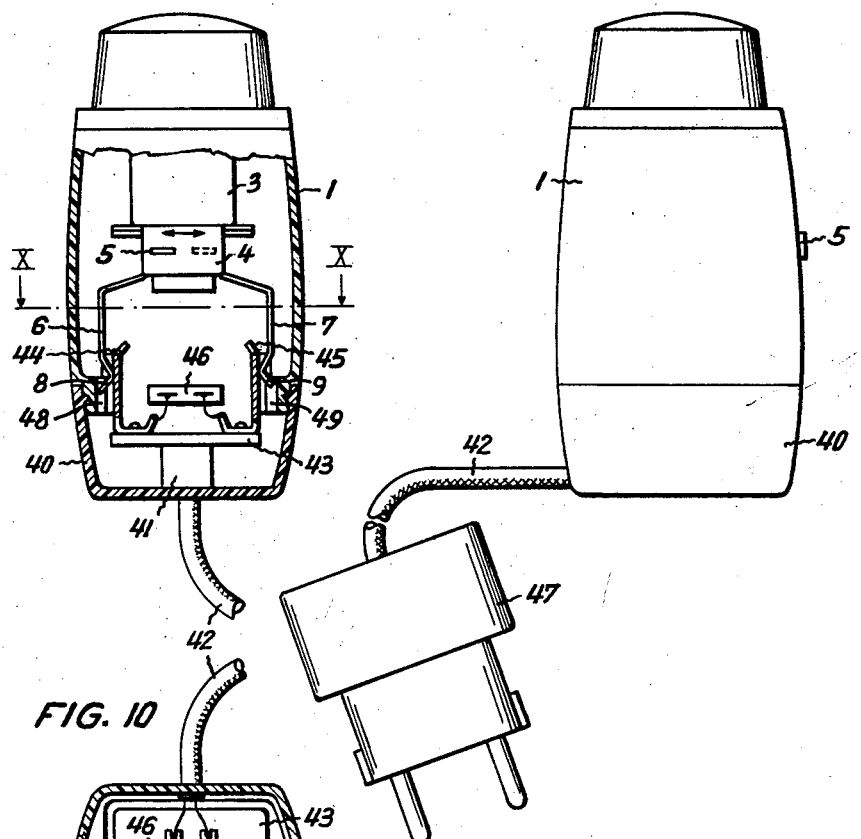
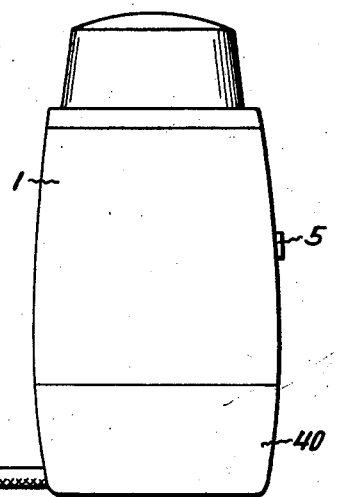
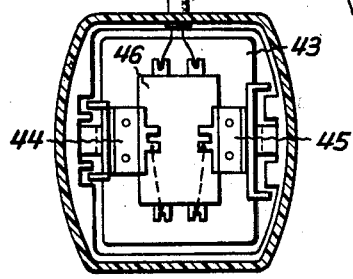
Inventor:
FRITZ HARTWIG
BY Toulmin & Toulmin
ATTORNEYS United States Patent Office 3,079,510
Patented Feb. 26, 1963

3,079,510
DRY SHAVING APPARATUS COMBINING
VARYING SOURCES OF POWER
Fritz Hartwig, Oldenburg, Germany, assignor to Licentia
Patent-Verwaltungs-GMBH., Hamburg, Germany
Filed Oct. 31, 1958, Ser. No. 771,145
Claims priority, application Germany Nov. 1, 1957
6 Claims. (Cl. 307—65)

The present invention relates to a hand gadget, particularly a shaving apparatus.

More particularly, the present invention relates to a shaving apparatus incorporating a shaving head and a motor which is connected thereto for driving the same, which apparatus is adapted to be electrically energized in any one of a number of different ways.

There exist dry shavers incorporating a universal type motor or an oscillating armature type motor which is energizable by an alternating current source and which can be connected to either a 110/125 v. or a 220 v., 50/60 c.p.s. source, suitable switching or plug means being provided for making it possible for the motor to be run from either of these sources.

There also exist dry shavers which do not require an outside source of energy, such as shavers in which the shaving head is driven by a mechanical motor, as, for example, a spring-wound motor or an inertia motor, or by a D.C. motor which is energized by a dry cell battery or a small rechargeable storage battery. This battery may be removably mounted, although in the case of a rechargeable battery, the same may be permanently mounted if suitable recharging means are included in the shaver.

Furthermore, there are shaving apparatus which can be energized either by a battery or from an external source of electric energy. In such apparatus the battery has associated with it a rectifier, as well as a wall plug by means of which the shaver may be plugged into house current. In such case, the plug usually carries a transformer, and the electrical connection is such that when the plug is plugged in, the shaver motor will be energized by the house current and the battery will at the same time be recharged. The single switch that is usually provided serves solely to turn the shaver on and off at such time as it operates on a battery, whereas the turning on and off of the line voltage is effected simply by the insertion and removal of the plug. While apparatus of this type can be operated either on battery or on line voltage, they have a number of unavoidable disadvantages in that they are relatively heavy and usually quite unwieldy. Also, the extension cord prevents free manipulation of the shaver, even when the latter is operating on a battery. Furthermore, a suitable resting place must be provided for the transformer-carrying plug. On the other hand, when the shaver is operated on line voltage, the battery itself is just so much dead weight. It should also be noted that existing dry shavers which incorporate a battery as well as re-charging and plug-in means which allow the shaver to be plugged directly into a wall socket for recharging purposes, are much larger and heavier than comparable shavers which can operate on line voltage only. It is true, however, that this type of shaver does not have a bothersome electrical extension cord attached to it.

It will be seen from the above, that while some of the known shaving apparatus which can be energized in more than one way—but only in two ways—none has advantages other than just that, i.e., the possibility of operating either on a battery or on house current, whereas each such apparatus has a very serious disadvantage, namely, when used as a battery operated apparatus, it is more cumbersome than a simple shaver which can operate only on a battery, and when used on house current, it is much heavier and larger than a shaver which can be operated only on house current.

It is, therefore, an object of the present invention to provide a shaving set which overcomes the above disadvantages.

It is another object of the present invention to provide a shaving set which allows the shaver to be energized in any number of different ways.

The objects of the present invention also include the provision of a shaving set incorporating a shaver which can be operated on its own battery, or on outside battery, as, for example, an automobile battery, or an ordinary 110/125 v. or 220 v. household current.

It is a still further object of the present invention to provide a shaver capable of operating either on its own battery or from an outside source of electrical energy, but which shaver when actually operated on its own battery has all of the advantages of a shaver that can operate only on its own battery, and which shaver when actually operated from an outside source has all the advantages of a shaver that can operate only when energized from an outside source.

It is yet another object of the present invention to provide a shaver which can easily and readily be adapted to run on its own battery or from an outside source of electrical energy.

With the above objects in view, the present invention mainly resides in a shaving set which comprises a work unit having a shaving head and a D.C. motor connected thereto for driving the same, and a plurality of power units each having a power supplying means which is dissimilar to the power supplying means of the other power units, but each of which power supplying means has a D.C. output suited for energizing the motor of the work unit. Each of the power units is adapted to be coupled with and uncoupled from the work unit in such a manner that whenever any one of the power units is coupled with the work unit, the thus-coupled units together form a shaver capable of being held by hand and the power supplying means of such power unit is electrically connected to the motor of the work unit.

More particularly, the power supplying means of one of the power units comprises a battery which is contained within the shaver formed when this one power unit is coupled with the work unit; the power supplying means of another of the power units is electrically connectible to an outside battery; and the power supplying means of yet another of the power units is electrically connectible to an outside source of alternating current.

Thus, irrespective of the manner in which the motor is energized, the shaver will contain only those components necessary for the particular mode of operation, so that the shaver will at all times be as small, light and handy as possible. Furthermore, a high degree of reliability is assured.

Additional objects and advantages of the present invention will become apparent upon consideration of the following description taken in conjunction with the accompanying drawings in which:

FIG. 5 is a sectional elevational view of the shaver used in conjunction with a power unit enabling the shaver to be operated on house current;

FIG. 6 is a partial sectional view taken on line 6—6 of FIG. 5;

FIG. 7 is a sectional elevational view taken on line 7—7 of FIG. 5;

FIG. 8 is a partial sectional elevational view of another modification of the shaver shown in FIG. 5; on line 8—8 of FIG. 7; and FIG. 9 is a side view of the shaver shown in FIG. 8;

FIG. 10 is a sectional view taken on line 10—10 of FIG. 8.

Figure 1:
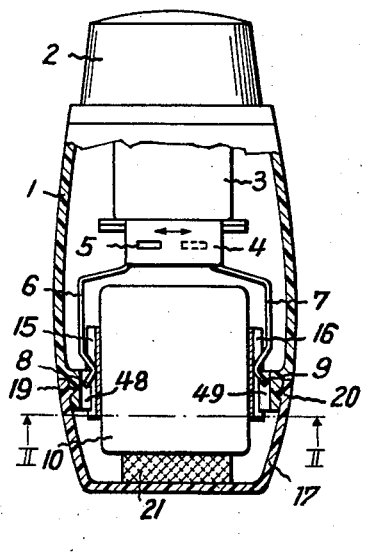
FIG. 1 is a sectional elevational view of a shaver used in conjunction with a power unit incorporating a battery.
Figure 2:
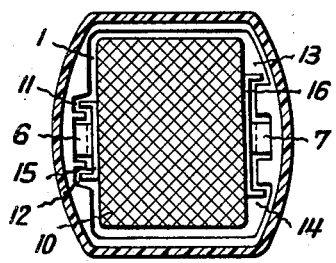
FIG. 2 is a sectional view taken on line 2—2 of FIG. 1.

Referring now to the drawings, and to FIGS. 1 and 2 thereof in particular, there is shown a shaver which is composed of a work unit and power unit that are coupled to each other to form the shaver. The work unit comprises a casing 1 carrying a shaving head 2 and a D.C. motor 3 which is connected to the shaving head 2 for driving the same. The motor has attached to it a switching mechanism 4 the actuator 5 of which protrudes exteriorly of the casing 1, as well as two lead-in elements in the form of contact springs 6 and 7. The lower end portions of the contact springs 6 and 7 are inwardly crimped, and the lowermost extremities 8 and 9 of these springs are in contact with their casing 1 so that a strong contact pressure is exerted upon a battery 10 located between the springs. This battery may be a dry-cell battery, or may be in the form of a small rechargeable storage battery.

The two opposite sides of the casing 1 at which the spring extremities contact the same, are reinforced in such a manner that on each side a groove or notch 48 and 49 is formed within which these spring extremities 8 and 9 are received. Furthermore, two additional grooves 11 and 12 are provided on opposite sides of the groove within which the spring extremity 8 is located, and two additional grooves 13 and 14 are provided on opposite sides of the groove within which the spring extremity 9 is located. It will be noted that the grooves 11 and 12 are closer to each other than are the grooves 13 and 14. The battery 10 carries two U-shaped portions 15 and 16, the arms of the portion 15 being spaced from each other a distance corresponding to the distance between the grooves 11 and 12, and the arms of the portion 16 being spaced from each other a distance corresponding to the distance between the grooves 13 and 14. The U-shaped portions 15, 16 and the grooves 11, 12, 13, 14 thus act as indexing means which serve to make sure that the battery 10 can be placed between the contact springs 6 and 7 only wth the proper polarity, i.e., the indexing means serve to position the battery 10 in such a manner that its polarity will correspond to that required by the motor 3.

It will be seen from the above that the contact springs 6 and 7 thus act not only as electrical lead-ins between the battery 10 and the motor 3, but also serve as mechanical retaining means for holding the battery in place.

The casing 1 is closed by a cup-shaped end cap 17 which is formed with tongues 19 and 20 that may be snapped into corresponding grooves formed in the casing 1. An elastic insert 21, which may be glued or otherwise secured to the inner face of the cup 17, presses against the battery 10. If desired, the battery 10 may be secured to the cap 17.

It will be seen from the above that the cup 17 in conjunction with the battery 10 constitutes a power unit which may be coupled with or uncoupled from the work unit incorporating the shaving head 2 and the motor 3, and that when these two units are coupled they form a complete shaver which is capable of being held by hand. Furthermore, the battery 10, which constitutes the power supplying means of the power unit, will be electrically connected to the motor 3.

Figure 3:
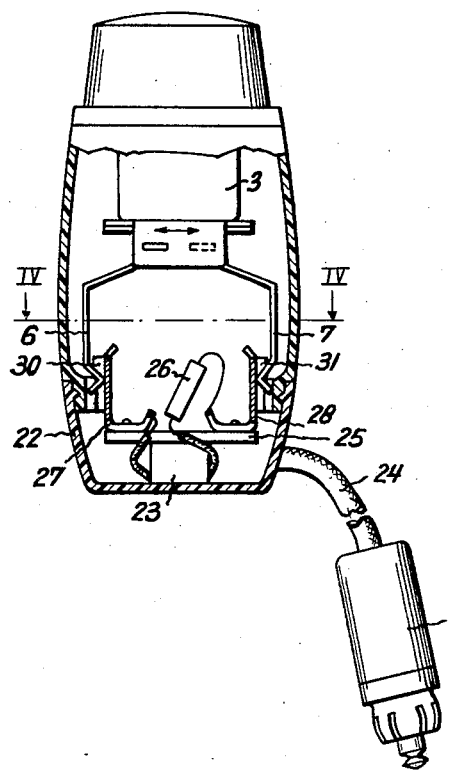
FIG. 3 is a sectional elevational view of the shaver used in conjunction with a power unit enabling the shaver to be operated on an outside battery.
Figure 4:
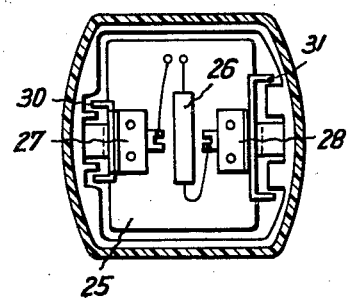
FIG. 4 is a sectional view taken on line 4—4 of FIG. 3.

FIGS. 3 and 4 show the same work unit as described above when used in conjunction with a different power unit. The latter comprises a cup-shaped casing 22 which carries a binding post 23 to which an extension cord 24 is attached. This binding post also carries a terminal block 25 on which two contact pieces 27 and 28 are mounted. When the casing 22 is coupled with the work unit, these contact pieces 27 and 28 are in contact with the contact springs 6 and 7, respectively. One of the two wires of the extension cord is connected to the contact piece 27 and the other is connected to the contact piece 28 by way of a current limiting resistor 26.

The extension cord 24 carries at its free end a plug 29 which is illustrated as being of the type adapted to be connected to a motor vehicle battery by way of a conventional cigar lighter socket. In this way, the shaver can be energized from an external power source.

In order to avoid the possibility of polarity error, the contact pieces 27 and 28 carry laterally extending portions 30 and 31, respectively, the portions 30 being spaced from each other the same distance as the grooves 11 and 12 and the portions 31 being spaced from each other the same distance as the grooves 13 and 14.

If desired, the single resistor 26 may be replaced by two resistors one of which can be shortcircuited by suitable switch means (not shown) mounted on the terminal block 26. The shaver may thus be adapted for operation on either one of two different voltages. These two voltages may, for example, be 6 v. and 12 v., so that the shaver can be used interchangably on vehicles having either a 6 v., or a 12 v. electrical system.

FIGS. 5, 6 and 7 show the same work unit in conjunction with yet another power unit. The latter comprises a cup-shaped casing 32 which carries a terminal block 33 to which the extension cord 34 is connected. The terminal block carries a transformer 35 capable of transforming 110/125 v. or 220 v. A.C. to the voltage of the motor 3, as well as a rectifier 36 for rectifying this A.C. to D.C. The transformer occupies the same space which the battery 10 occupied while the work unit was coupled with the power unit shown in FIGS. 1 and 2. The transformer carries contact pieces 37 and 38 which are formed with suitable laterally extending portions corresponding to those of the contact pieces 27 and 28 (FIGS. 3 and 4, supra), for preventing the possibility of polarity error.

The cord 34 carries at its free end a conventional male plug connector 39 adapted to be plugged into an ordinary house current outlet socket, so that the shaver may be operated on an external A.C. source.

FIGS. 8, 9 and 10 show a shaver the power unit of which differs from that shown in FIGS. 5, 6 and 7, in that the transformer instead of being within the shaver proper is carried by the conector plug, so that the weight of the shaver itself is materially reduced. Furthermore, the power unit of the shaver of FIGS. 8, 9 and 10 may be substantially smaller than the power unit of FIGS. 5, 6 and 7 so that the handling of the shaver is greatly facilitated. Thus, the power unit shown in FIGS. 8, 9 and 10 incorporates a cup-shaped casing 40 which carries only a binding post 41 for the extension cord 42, a terminal block 43, two contact pieces 44 and 45 which are similar in construction to the contact pieces 27 and 28 (FIGS. 3 and 4 supra), and a rectifier 46. The free end of the cord 42 is connected to the transformer-carrying connector plug 47.

If desired, the rectifier 46 may be carried by the plug 47, instead of within the power unit.

It will be seen from the above, that a shaving set according to the present invention incorporates a work unit having a shaving head 2 and a motor 3 connected thereto for driving the same, and a plurality of power units each having a power supplying means which is dissimilar to the power supplying means of the other power units but each of which power supplying means has a D.C. output suited for energizing the motor 3 of the work unit. Furthermore, the construction of the work unit and the different power units is such that each power unit may readily and easily be coupled with and uncoupled from the work unit, and that whenever any one of the power units is in fact coupled with the work unit, the thus-coupled units together form a shaver capable of being held by hand. Also, the power supplying means of any power unit which is thus coupled to the work unit is electrically connected to the motor 3, with suitable indexing means being provided for making certain that the electrical connection between the motor and the power supplying means of any power unit will be of the proper polarity.

Thus, FIGS. 1 and 2 show a power unit in which the power supplying means includes a source of electrical energy contained entirely within the shaver which is formed when this power unit is coupled with the work unit, whereas the other figures show power units in which the power supplying means by themselves do not include a source of electrical energy but are connectible to an outside source of electrical energy. In the case of the power unit shown in FIGS. 3 and 4 this outside source is a battery, such as an automobile battery, whereas in the case of the two power units shown in FIGS. 5, 6, 7 and 8, 9, 10, the source is an alternating current source. Thus, the term "power supplying means" as used throughout the instant specification and claims is deemed to include means which incorporate a source of electrical energy as well as means which do not by themselves incorporate such a source but which are connectible to one.

It will also be seen from the above that according to the present invention a single work unit having a shaving head and a motor therefor may be used as a completely self-contained apparatus as well as an apparatus powered by an external source of electric energy. This may be done by coupling the work unit with the appropriate one of the above-described power units.

It will be understood that this invention is susceptible to modifications in order to adapt it to different usages and conditions, and, accordingly, it is desired to comprehend such modifications within this invention as may fall within the scope of the appended claims.

What is claimed is:

1. Hand gadget comprising; a casing having an opening; a shaving head on one end of said casing opposite said opening; a motor in said casing for driving said shaving head; two spring arms connected to the motor, protruding symmetrically therefrom toward said opening, and resting with the outer ends against opposite inner wall portions of said casing adjacent said opening, said ends having a crimped portion each; a cap detachably mounted on said casing for covering said opening; electrical conductor means in said cap and secured thereto, urging said crimped portions of said springs against the wall of said casing, thereby securing said cap to said casing and providing electrical contact between said conductor means and said spring arms; and power supply means in said cap, connected thereto and electrically connected to said conductor means.

2. A dry shaver apparatus as claimed in claim 1 with said cap containing a battery as power supply means.

3. A dry shaver apparatus as claimed in claim 1 wherein said cap contains resistance means connected to one of said conductor means, and having an extension cord having one end connected to said cap and having an electrical contact plug on the other end thereof, said resistance being in circuit with said cord to limit the current conducted to said electric motor through said cord.

4. A dry shaver apparatus as claimed in claim 1 with said electric motor being of the direct current type, said cap containing transformer means as power supply means electrically connected to a source of alternating current, and a rectifier in said cap connected to said conductor means therein for rectifying the alternating current into direct current.

5. A dry shaver apparatus as claimed in claim 1 with said power supply means comprising a rectifier connected to an electrical extension cord having an electrical connector at the free end thereof, and a transformer in said connector.

6. Hand gadget comprising, a casing having an opening; a shaving head on one end of said casing opposite said opening; a D.C. motor in said casing positioned between said opening and said shaving head for driving the latter; a pair of resilient, electrical connector means having crimped portions and protruding from said motor symmetrically toward said opening and engaging opposite portions of the walls of said casing adjacent said opening; a cap detachably mounted on said opening; contact pieces in said cap and secured thereto, said contact pieces engaging said resilient connector means at the crimped portions thereof and urging them against said casing for securing positioning of said cap on said opening of said casing thereby making electrical contact; a pair of laterally extending portions on each of said contact pieces, the distance between the portions on one piece being different from the distance between the portions on the other piece; two means individually defining grooves in said casing adjacent said protruding connector means, with each groove defining means capable of receiving a particular pair of said pair of portions only; a power supply unit having electric current magnitude converting means with D.C. output and being electrically connected to said contact pieces; and a cord attached to said cap, terminating in an electric contact plug and being electrically connected to said current converting means.

References Cited in the file of this patent

UNITED STATES PATENTS

| 1,093,102 | Bonham | Apr. 14, 1914 |
| 1,981,787 | Florman | Nov. 20, 1934 |
| 2,078,845 | Goldschmidt | Apr. 27, 1937 |
| 2,149,995 | Gruessner | Mar. 7, 1939 |
| 2,232,271 | Rider | Feb. 18, 1941 |
| 2,256,871 | Silver | Sept. 23, 1941 |
| 2,368,951 | Tolmie | Feb. 6, 1945 |
| 2,721,382 | Beauchaine | Oct. 25, 1955 |
| 2,773,306 | Ranson | Dec. 11, 1956 |
| 2,867,039 | Zach | Jan. 6, 1959 |

FOREIGN PATENTS

| 462,397 | Italy | Mar. 13, 1951 |
| 718,067 | Great Britain | Nov. 10, 1954 |